United States Patent Office 3,200,108
Patented Aug. 10, 1965

3,200,108
BASIC AZO DYES DERIVED FROM INDAZOLE
Gilbert Victor Henri Kremer, Ermont, and Robert Frederic Michel Sureau, Enghien-les-Bains, France, assignors to Manufactures de Produits Chimique du Nord Etablissements Kuhlmann, Paris, France
No Drawing. Filed Oct. 30, 1962, Ser. No. 234,234
Claims priority, application France, Nov. 3, 1961, 877,864
3 Claims. (Cl. 260—157)

The present invention concerns new basic azo dyes derived from indazole.

The invention relates more particularly to new basic dyes having the general formula:

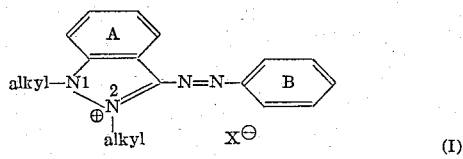

(I)

in which the nuclei A and B may be substituted by halogen atoms or by alkyl, alkoxy, nitro, cyano, alkylsulphonyl, sulphonamide and acylamino groups but are free from hydroxyl, amino, alkylamino, arylamino groups and their C-substituted derivatives and X represents a monovalent anion or its equivalent, and wherein the alkyl groups in positions 1 and 2 of the indazole nucleus may be identical or different.

The dyes of Formula I may be produced by two different methods.

(1) By condensation, in an aqueous medium, of a 1,2-dialkyl indazolium salt, having in the 3 position a halogen atom or a sulphonic group, with an aryl hydrazine, for example, according to the following reaction

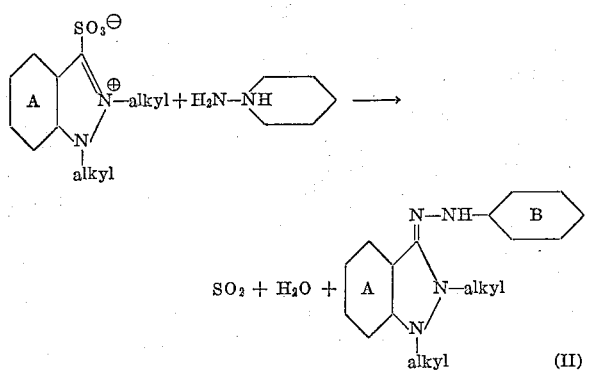
(II)

followed by an oxidation in an acid medium according to the following reaction;

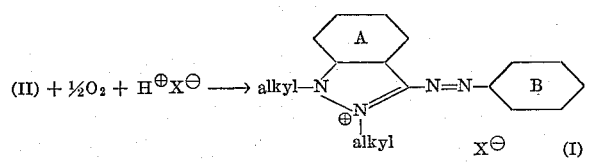

(I)

The 1,2-dialkyl indazolium salts which can be used in the condensation reaction may be, for example, those described and claimed in pending United States patent application Serial No. 140,260 filed on September 25, 1961. The condensation with aryl hydrazines may be effected in a mixture comprising water and an organic solvent miscible with water, such as an alcohol having from 1 to 5 carbon atoms, formamide, dimethylformamide, dioxane, in the presence of acid-absorbing agents, such as acetates, carbonates and alkaline bicarbonates, pyridine and triethylamine.

The oxidation may be effected in the same solvents as the condensation, and widely varying oxidants may be used, such as, for example, hydrogen peroxide, peracids, such as peracetic acid, organic peroxides such as those of ketones, mineral peroxides such as manganese dioxide, per salts such as the permanganates and persulphates, the chlorites and alkaline hypochlorites, ferric chloride or ferricyanides. The medium must be maintained acid by the addition of mineral or organic acids.

(2) By treating dyes having the following formula with alkylating agents;

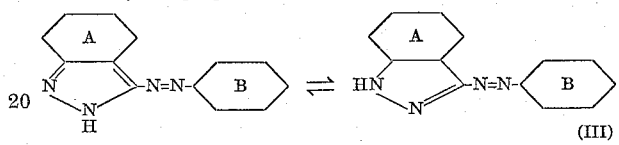

(III)

In the Formulae III, the possible substituents for the nuclei A and B are the same as in the Formula I. The alkylating agents which may be used are, for example, the alkyl halides, dialkyl sulphates or arylsulphonylalkyl esters.

The dyes of Formulae III, some of which are known, may be produced by various methods, for example:

(a) By treating the diazo derivative of o-toluidine or a substituted derivative thereof in the cold with a strongly alkaline solution.

(b) By coupling the diazo derivative of an amine of the formula B—$NH_2$ with indazole or a substituted derivative thereof, the substituent preferably being an electrorepelling group such as an alkyl or alkoxy group.

(c) By coupling the diazo derivative of 3-amino-indazole or a substituted derivative thereof with a benzene derivative having at least two alkoxy groups, such as m-dimethoxybenzene.

Moreover, it has been found that dyes with the Formula I are of great technical importance for dyeing fibres based on the polymers or copolymers of acrylonitrile to which they give strong yellow, orange or scarlet tints, having normally excellent general properties. The new dyes of Formula I thus augment the range of colurs available with the hitherto known 3-azo indazole dyes. These latter, which have an amino group on the B nucleus, extend only over the red, and blue-green ranges.

The following examples illustrate the invention without restricting it and the parts indicated therein are parts by weight.

Example 1

2.4 parts of o-tolyl-3-azo indazole (J. Liebigs Ann. der Chemie, vol. 305, pp. 339–1899) are dissolved in 50 parts of chlorobenzene heated to 120° C.; then there are added progressively to the solution during 30 minutes, under continuous agitation, 5 parts of methyl sulphate diluted with 5 parts of chlorobenzene. The mixture is heated for 8 hours at 130° C. allowed to cool and the insoluble dye is filtered off. In order to purify it, it is dissolved in 50 parts of water, the insoluble impurities are filtered off, and the dye is re-precipitated by adding 4 parts of a 50% zinc chloride solution. One obtains 2.8 parts of dyestuff. The dyestuff may be used for dyeing fibres based on polymers or copolymers of acrylonitrile to a yellow which is very fast to light.

Example 2

By replacing in Example 1 the o-tolyl-3-azo indazole by 2′,4′-dimethyl phenyl-1′,3-azo-5-methyl indazole, one obtains under similar conditions a dye for dyeing fibres based on polymers or copolymers of acrylonitrile to a slightly more orange yellow, with otherwise similar properties.

Example 3

5.42 parts of 5-nitro-1,2-dimethyl indazole-3-sulphobetaine and 3.50 parts of 4-methoxy phenyl hydrazine chlorhydrate are made into a paste with 30 parts of alcohol. 3.2 parts of sodium acetate and 0.2 parts of triethylamine are added. The mixture is heated under reflux for 6 hours on a water bath. The 4′-methoxy-3-phenylhydrazone-1,2-dimethyl-5-nitro indazoline is precipitated cold and separated by filtering, washed with water, then made into a paste with 50 parts of water containing 1 part of acetic acid and 0.01 part of ferrous ammonium sulphate. Then one adds 0.8 parts of sodium chlorite dissolved in 10 parts water and heats to 50° C. for 2 hours. After cooling the reaction mixture, the dye is precipitated by salting.

One obtains a water-soluble dye which dyes fibres based on polymers or copolymers of acrylonitrile to an orange yellow which is very fast to light.

Example 4

At 0° C. 1.35 parts of 3-amino indazole dissolved in 15 parts of water and 3 parts of 11 N hydrochloric acid are diazotised with 0.7 part of sodium nitrite dissolved in 5 parts of water; the solution of the diazo derivative is poured into 1.4 parts of 1,3-dimethoxy benzene and 4 parts of sodium acetate dissolved in 30 parts of acetic acid. The mixture is stirred for 5 hours and then diluted with 50 parts of water; this is followed by filtering, washing and drying the resulting dyestuff. This is then dissolved in 50 parts of dimethyl formamide; 5 parts of methyl sulphate and added and the mixture is heated for 4 hours at 90° C.

In order to separate the methylated dye, one dilutes with water and adds sodium chloride and zinc chloride. One obtains 2.8 parts of a water-soluble dye suitable for dyeing fibres based on polymers or copolymers of acrylonitrile to a deep orange which is fast to light.

Example 5

4.5 parts of 1,2-dimethyl-indazole-3-sulphobetaine are reacted at 70° C. with 3.5 parts of 4-methoxy phenyl hydrazine hydrochloride in suspension in 5 parts of dimethyl formamide and 2.4 parts of diethylaminoethanol.

After reaction, the mixture is diluted with 50 parts of 30% salt water and the hydrazone is isolated by filtration; it is washed on the filter with 50 parts of 30% salt water.

The hydrazone is made into a paste in 100 parts of water and 1 part of acetic acid and 0.05 part of ferrous sulphate. The suspension is cooled to +5° C. and a solution of 1.6 parts of codium chlorite in 20 parts of water are run in while agitating. These conditions are maintained for two hours then the mixture is heated for a moment to 90° C. and salted out with 25 parts of sodium chloride. The precipitated dyestuff is filtered cold and washed on the filter with 50 parts of 15% salt water. It dyes polyacrylic fibres a golden yellow shade of very good general fastness.

Example 6

5.4 parts of 5-nitro-1,2-dimethyl-indazole-3-sulphobetaine are condensed at 45° C. with 4.0 parts of 4-acetylminophenyl hydrazine hydrochloride in a mixture of 10 parts of dimethylformamide and 2.4 parts of diethyl-aminoethanol.

The reaction mixture is diluted with 50 parts of 15% salt water and the hydrazone is isolated by filtration; it is washed on the filter with 50 parts of 15% salt water.

The hydrazone obtained is made into a paste in 100 parts of water and 2 parts of acetic acid; it is heated to 40° C. and 1.6 parts of industrial sodium chlorite dissolved in 10 parts of water are progressively added with agitation.

After the introduction of the oxidising agent, agitation is continued for a further half hour, then heating is effected briefly to 90° C.

The dyestuff is precipitated by cooling; it is isolated by filtration and washed with 15% salt water.

It dyes polyacrylic fibres a fast yellow shade.

Example 7

8.1 parts of 2,5-dichloro-aniline are dissolved in 25 parts by volume of concentrated hydrochloric acid and 100 parts of boiling water. The mixture is rapidly cooled to between 0° C. and 15° C. and 48 parts by volume of a normal solution of sodium nitrite are added. The solution of the diazo compound is filtered and poured into 6 parts of indazole dissolved in 100 parts of formamide and 5 parts of pyridine.

A caustic soda solution, concentrated to alkalinity with thiazole yellow paper, is added to the coupling medium cooled to between 0° C. and 5° C. and agitation is continued for 2 hours.

The insoluble azo dyestuff is collected by filtration, washed with water and dried.

The azo dyestuff obtained is dissolved in 100 parts of hot chlorobenzene and 30 parts of methyl sulphate are added. The whole is heated to the boil under reflux for 2 hours.

The chlorobenzene is extracted from the boiling water and the basic dyestuff which crystallises by cooling of the aqueous phase is collected by filtration.

It dyes polyacrylic fibres a fast yellow shade.

We claim:

1. Dyes having the general formula:

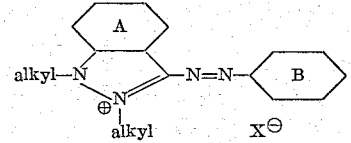

in which $X^{\ominus}$ is a monovalent anion, the benzene nucleus A is substituted by a member selected from the group consisting of hydrogen atoms, nitro and lower alkyl groups and the benzene nucleus B is substituted by a member selected from the group consisting of hydrogen, and chlorine atoms, lower alkyl, lower alkoxy and acetylamino groups.

2.

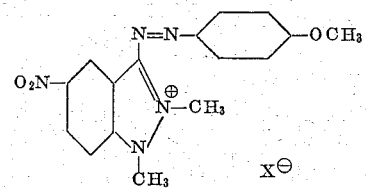

in which $X^{\ominus}$ represents a monovalent anion.

3.

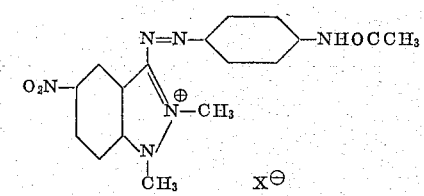

in which $X^\ominus$ represents a monovalent anion.

References Cited by the Examiner

UNITED STATES PATENTS

| | | | |
|---|---|---|---|
| 2,448,870 | 9/48 | Dickey et al. | 260—157 |
| 2,872,449 | 2/59 | Baumann et al. | 260—157 |
| 2,893,816 | 7/59 | Tsang et al. | 260—157 XR |
| 2,989,360 | 6/61 | Mautner | 8—55 |
| 3,078,137 | 2/63 | Baumann et al. | 260—157 XR |

FOREIGN PATENTS

| | | |
|---|---|---|
| 1,238,315 | 7/60 | France. |
| 1,254,350 | 1/61 | France. |
| 871,426 | 6/61 | Great Britain. |

OTHER REFERENCES

Bamberger, "J. Liebigs Ann. der Chemie," vol. 305, pp. 289–369 (1899).

CHARLES B. PARKER, *Primary Examiner*.